(12) United States Patent
Kim et al.

(10) Patent No.: US 7,747,298 B2
(45) Date of Patent: Jun. 29, 2010

(54) SLIDING DEVICE FOR PORTABLE TERMINAL

(75) Inventors: Jong-Yang Kim, Seoul (KR); Soo-Ik Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 836 days.

(21) Appl. No.: 11/511,359

(22) Filed: Aug. 29, 2006

(65) Prior Publication Data

US 2007/0049075 A1 Mar. 1, 2007

(30) Foreign Application Priority Data

Aug. 29, 2005 (KR) .................... 10-2005-0079375

(51) Int. Cl.
*H04M 1/00* (2006.01)
*H04B 1/38* (2006.01)

(52) U.S. Cl. ................ 455/575.4; 455/575.1; 455/90.3; 455/556.1

(58) Field of Classification Search .............. 455/575.4, 455/550, 90, 556; 439/131
See application file for complete search history.

(56) References Cited

U.S. PATENT DOCUMENTS

| | | | | |
|---|---|---|---|---|
| 2002/0137476 | A1* | 9/2002 | Shin | 455/90 |
| 2005/0009581 | A1* | 1/2005 | Im et al. | 455/575.4 |
| 2005/0049019 | A1* | 3/2005 | Lee | 455/575.4 |
| 2005/0122669 | A1* | 6/2005 | Lee | 361/679 |
| 2006/0211460 | A1 | 9/2006 | Jeong et al. | |

FOREIGN PATENT DOCUMENTS

| | | |
|---|---|---|
| CN | 1578334 | 2/2005 |
| CN | 1627772 | 6/2005 |
| DE | 198 06 508 | 8/1999 |
| EP | 1 496 674 | 1/2005 |
| EP | 1 499 094 | 1/2005 |
| EP | 1 528 761 | 5/2005 |
| EP | 1 542 435 | 6/2005 |
| EP | 1 638 295 | 3/2006 |
| KR | 10-2006-0095299 | 8/2006 |
| WO | WO 2005/081415 | 9/2005 |

* cited by examiner

*Primary Examiner*—Lester Kincaid
*Assistant Examiner*—Kuo Woo
(74) *Attorney, Agent, or Firm*—Roylance, Abrams, Berdo & Goodman, L.L.P.

(57) ABSTRACT

A sliding device for a portable terminal includes a sliding module capable of sliding a sliding housing in multiple steps. The portable terminal has a body housing, a sliding housing that slides on the body housing while facing the body housing, and a sliding device for enabling the sliding housing to slide on the body housing. The sliding device includes a base member provided with a sliding movement member, a sliding member assembled with the base member so as to slide along a length of the base member semi-automatically, a pair of guide members provided to the sliding member and assembled with the sliding movement member so as to guide the sliding movement of the sliding movement member, and a multiple step movement member formed on the guide members and detachably assembled with the sliding movement member for sliding the sliding member in multiple steps.

9 Claims, 13 Drawing Sheets

SLIDING DEVICE FOR PORTABLE TERMINAL

CROSS-REFERENCE TO RELATED APPLICATION

This application claims the benefit under 35 U.S.C. §119 (a) of an application entitled "Sliding Device For Portable Terminal" filed with the Korean Intellectual Property Office on Aug. 29, 2005 and assigned Serial No. 2005-79375, the entire contents of which are hereby incorporated by reference.

BACKGROUND OF THE INVENTION

1. Field of the Invention

The present invention relates to portable terminals, such as cellular phones, Personal Digital Assistants (PDAs), hand held phones, MP3 phones, game phones, camera phones, internet phones, combinations of these devices, and the like. More particularly, the present invention relates to a sliding device for a sliding type portable terminal which includes a sliding module capable of sliding a sliding housing in multiple steps.

2. Description of the Related Art

In general, a "portable terminal" is an electronic device which a user can carry to wirelessly communicate with another user. Conventional portable terminals may be classified into various types according to their appearance, such as bar type portable terminals, flip type portable terminals, and folder type portable terminals. A bar type portable terminal has a single housing shaped like a bar. A flip type portable terminal has a flip panel which is pivotally mounted to a bar-shaped housing by a hinge unit. A folder type portable terminal has a folder coupled to a single bar-shaped housing by a hinge unit in such a manner that the folder can be rotated in order to be folded or unfolded from the housing.

Portable terminals may also be classified as neck-wearable type terminals or wrist-wearable type terminals, according to the position at or the way in which a user wears the terminal. In addition, portable terminals may be classified into swing type terminals, sliding type terminals, and sliding-swing type terminals. These various classifications are well understood by those skilled in the art.

As shown in FIGS. 1 to 5, a sliding type portable terminal 1 includes a body housing 2 having a plurality of keypads 2a and a microphone unit 2b arranged thereon, and a sliding housing 3 which can slide along the body housing 2 to a position corresponding to about one-third of the entire length of the body housing. Generally, the body housing 2 has a 3×4 matrix keypad arranged thereon. The sliding housing 3 includes an auxiliary keypad on which a plurality of auxiliary keys are arranged, a speaker unit 3a, and a display unit 3b.

As shown in FIGS. 3 and 4, the conventional sliding type portable terminal 1 includes a body housing 2, a sliding housing that slides on the body housing 2 by a predetermined distance, a sliding module 4 disposed between the body housing 2 and the sliding housing 3 for enabling the sliding housing 3 to slide on the body housing, and at least one coil spring 5 provided between the sliding housing 3 and the body housing 2 for supplying elasticity to the sliding housing to assist the sliding movement of the sliding housing on the body housing.

As shown in FIGS. 3 and 4, the sliding module 4 includes a main plate 4a provided in the body housing 2 and a sliding plate 4b provided in the sliding housing 3.

As shown in FIG. 5, the sliding module of the conventional portable terminal has a structure in which the coil spring causes the sliding housing to slide on the body housing to a position at which the sliding movement of the sliding housing is completed. When the sliding housing is repeatedly moved, the elasticity of the coil spring may degrade. Further, the sliding module does not provide a tactile sensation (such as a click) when the sliding housing slides on the body housing. Thus, a user may not fully appreciate the sliding movement of the sliding housing.

Further, the sliding module of the conventional portable terminal can enable the sliding housing to slide on the body housing only in one longitudinal direction of the portable terminal, so as to open the sliding housing by about one-third of the entire length of the body housing. Thus, there is a disadvantage in that it is impractical to use the remaining, non-opened space on the body housing of the portable terminal, and optimal use of space in the portable terminal is impeded.

Accordingly, there is a need for an improved sliding device for a portable terminal.

SUMMARY OF THE INVENTION

An aspect of the present invention is to address at least the above problems and/or disadvantages and to provide at least the advantages described below. Accordingly, an aspect of the present invention is to provide a sliding device for a portable terminal, which includes a sliding module capable of sliding a sliding housing in multiple steps, so as to allow the sliding housing to slide.

It is another object of the present invention to provide a sliding device for a portable terminal which includes a sliding module capable of sliding a sliding housing in multiple steps, so as to provide a tactile sensation (such as a click) to a user when the sliding housing slides on a body housing of the portable terminal so that the user appreciates the sliding movement of the sliding housing.

It is still another object of the present invention to provide a sliding device for a portable terminal which allows a sliding housing to slide upward and downward along a body housing of the portable terminal, thereby improving the use of space in the portable terminal.

In order to accomplish these objects of the present invention, according to an exemplary embodiment of the present invention, a sliding device for a portable terminal including a body housing, a sliding housing sliding on the body housing while facing the body housing, and a sliding device for enabling the sliding housing to slide on the body housing is provided. The sliding device includes a base member with a sliding movement member, a sliding member assembled with the base member so as to slide along a length of the base member semi-automatically, a pair of guide members provided to the sliding member and assembled with the sliding movement member so as to guide the sliding movement of the sliding movement member, and a multiple step movement member formed on the guide members and detachably assembled with the sliding movement member for sliding the sliding member in multiple steps.

In order to accomplish these objects of the present invention, according to another exemplary embodiment of the present invention, a sliding type portable terminal is provided. The portable terminal includes a body housing extending longitudinally, and a sliding housing sliding upward and downward on the body housing in a longitudinal direction while facing the body housing, so as to open and close upper and lower portions of the body housing.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the exemplary embodiments of the invention and are merely exemplary. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Hereinafter, exemplary embodiments of the present invention will be described in detail with reference to the accompanying drawings.

Figure 1:
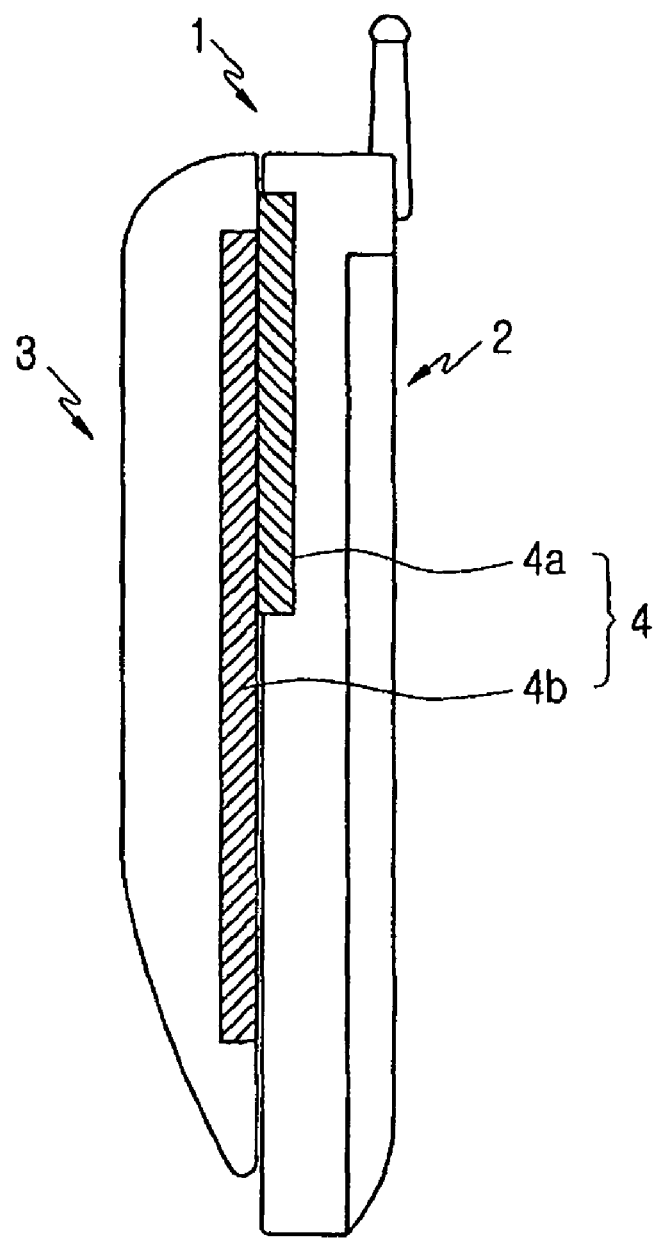
FIG. 1 is a longitudinal sectional view of a conventional sliding type portable terminal, before a sliding housing is open.
Figure 2:
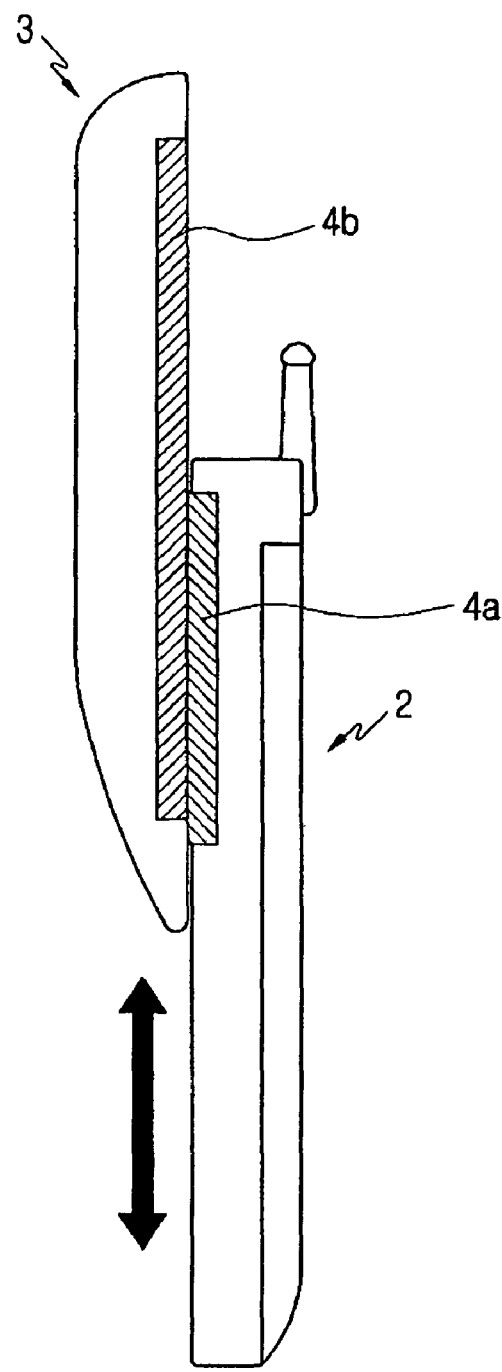
FIG. 2 is a longitudinal sectional view of the conventional sliding type portable terminal of FIG. 1, after the sliding housing is open.
Figure 3:
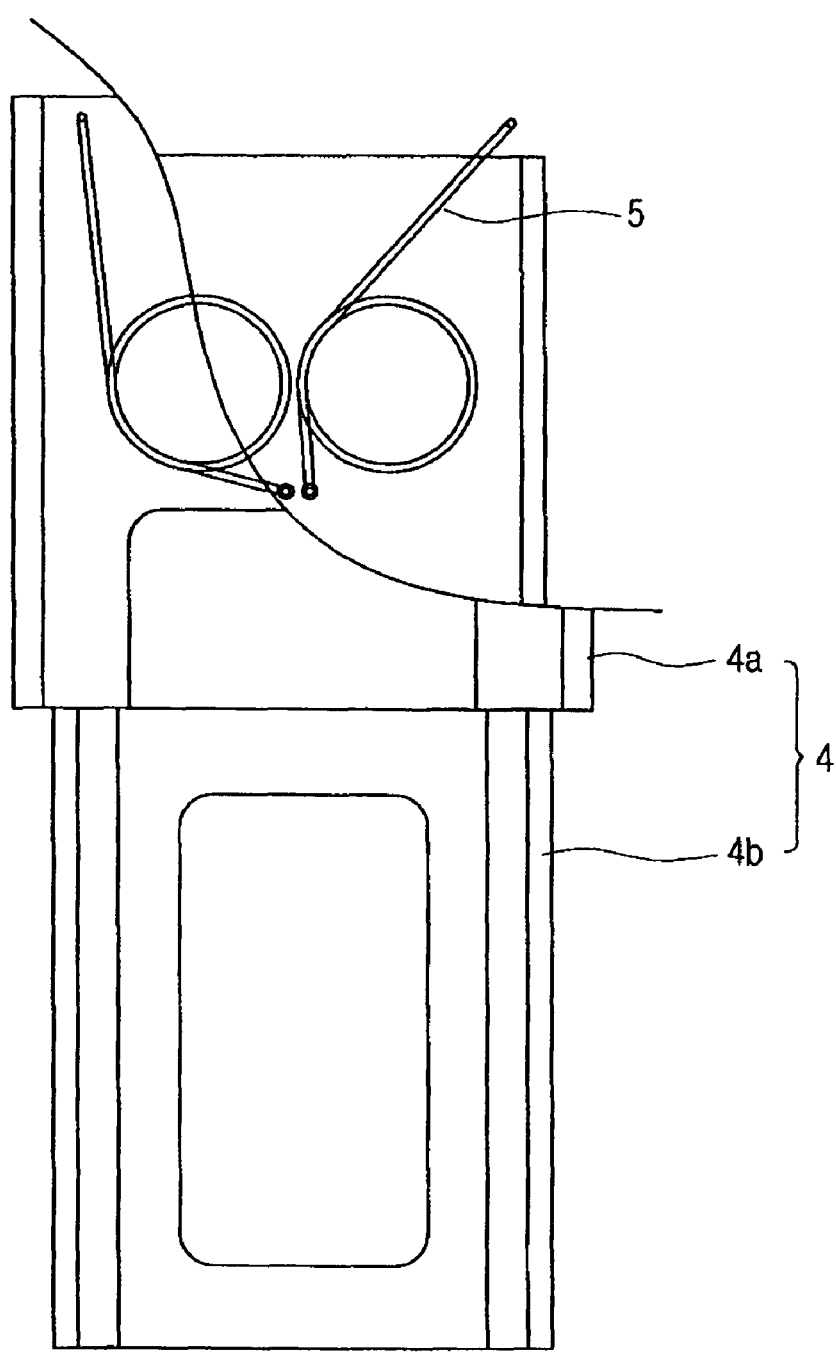
FIG. 3 is a front view of the conventional sliding type portable terminal of FIG. 1, which shows a main plate, a sliding plate, and a driving spring.
Figure 4:
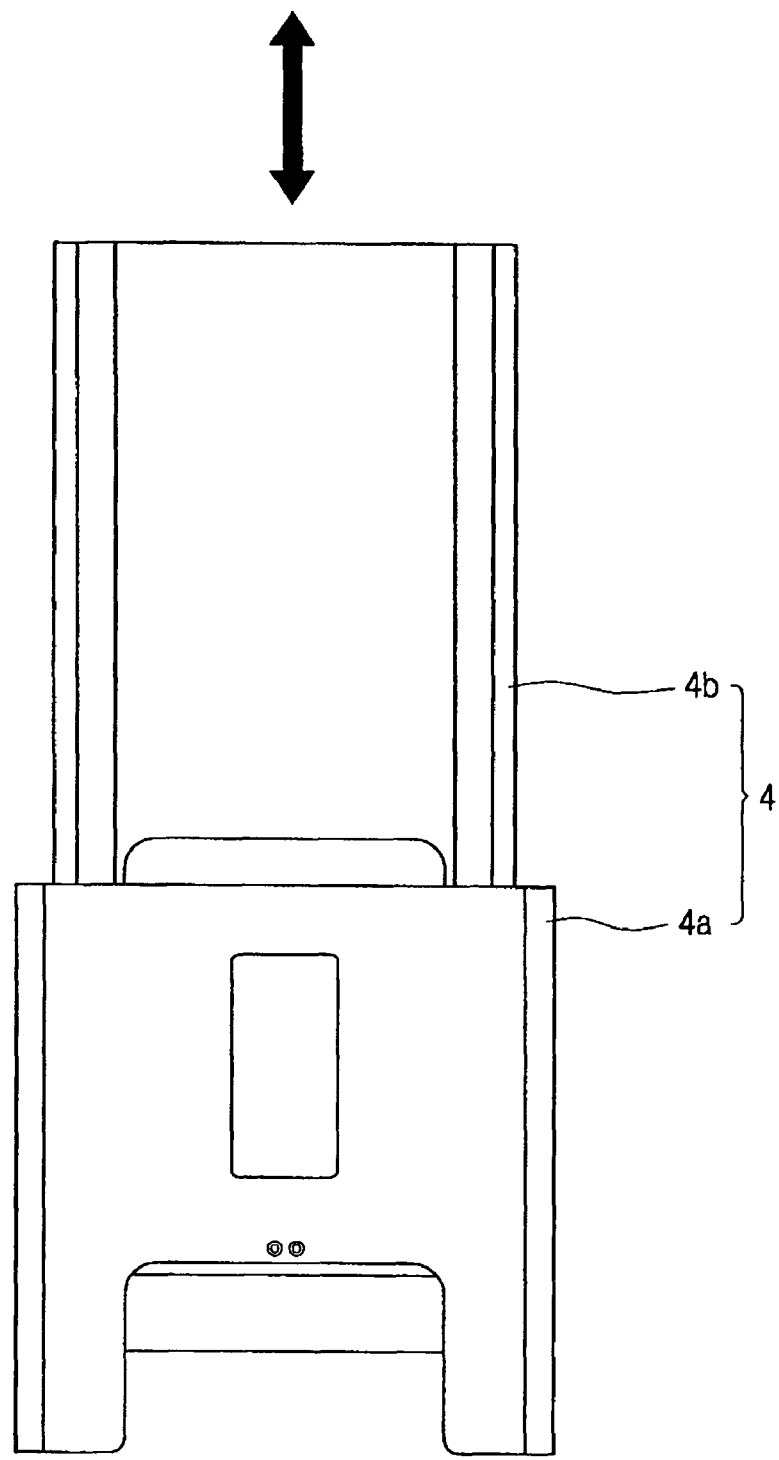
FIG. 4 is a front view of the conventional sliding type portable terminal of FIG. 1, which shows a main plate and a sliding plate.
Figure 5:
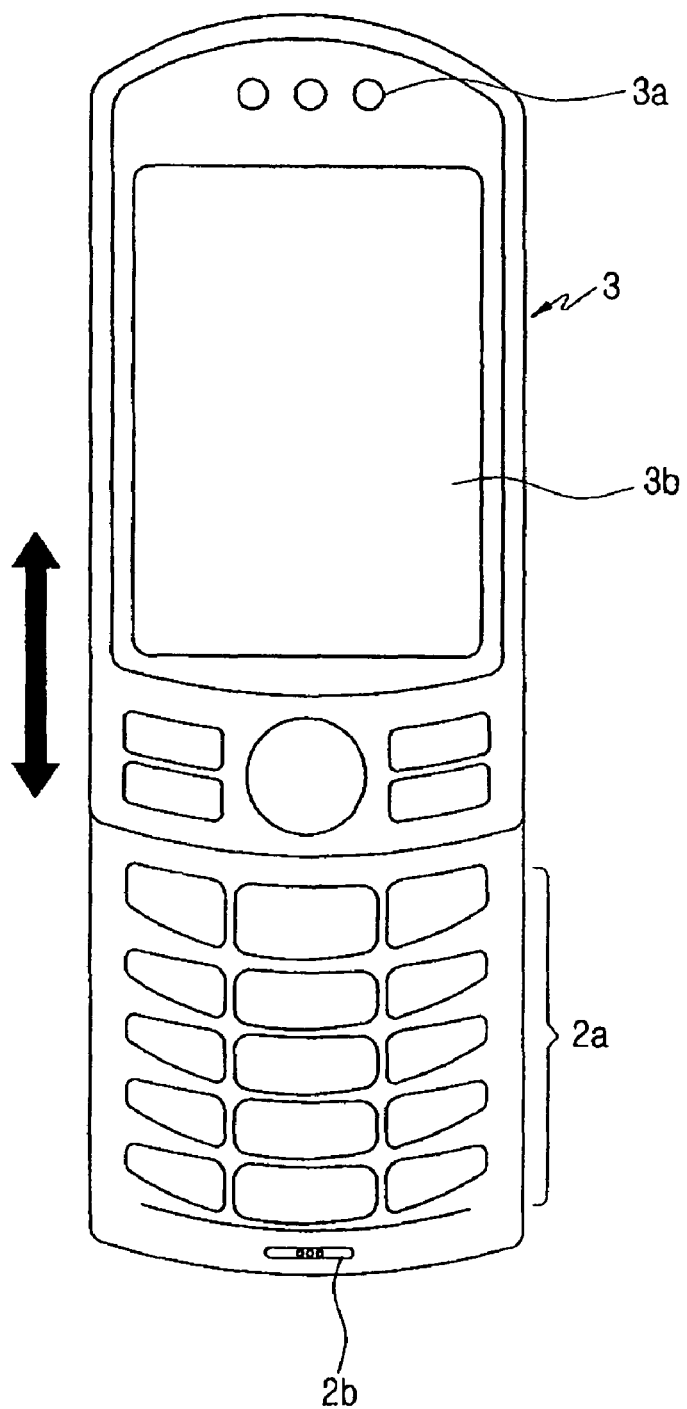
FIG. 5 is a front view of the conventional sliding type portable terminal of FIG. 1, in which the movement of a sliding housing is shown.
Figure 6:
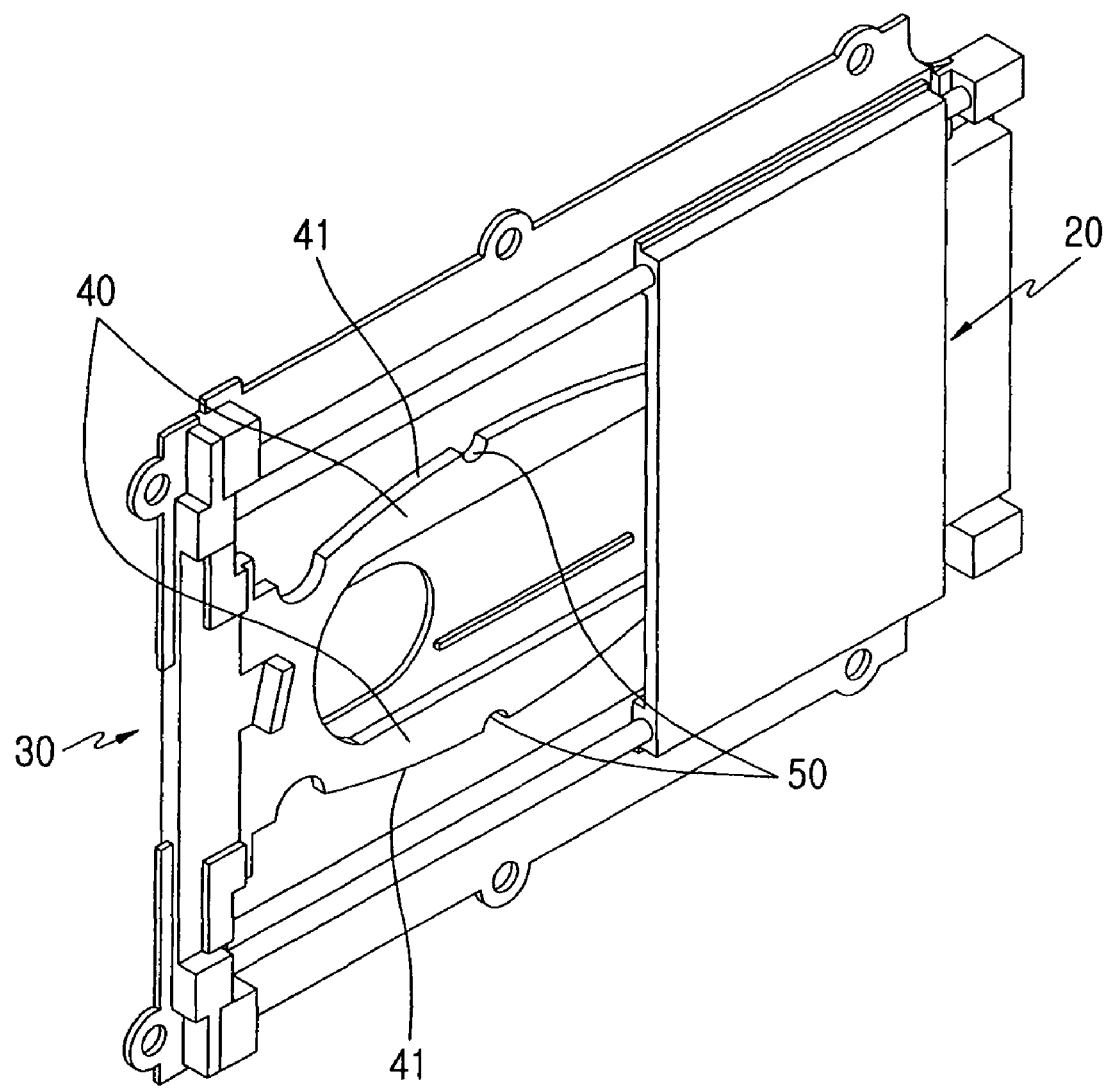
FIG. 6 is a perspective view of a sliding device for a sliding type portable terminal according to a first exemplary embodiment of the present invention.
Figure 7:
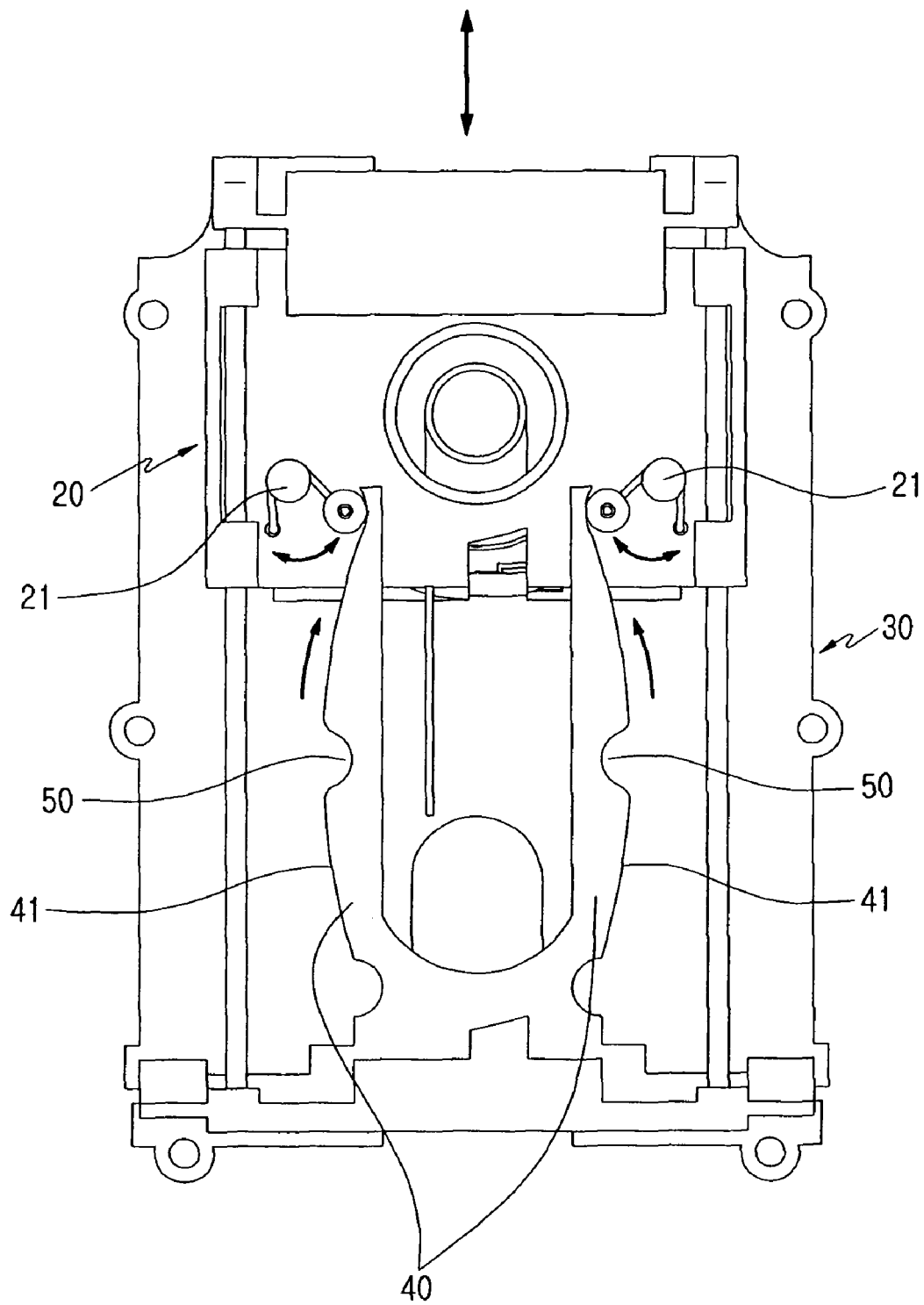
FIG. 7 is a plan view of the sliding type portable terminal according to the first exemplary embodiment of the present invention, before the sliding device operates.

As shown in FIGS. 6 and 7, a sliding device for a portable terminal includes a base member 20, a sliding member 30, a pair of guide members 40, and multiple step movement members 50. The base member 20 is mounted on the body housing 10 of the portable terminal, and the sliding member 30 is mounted on the sliding housing 11. The base member 20 engages the sliding member 30 so that the sliding member 30 can slide with respect to the base member 20. The pair of guide members 40 are disposed on the sliding member 30. A pair of sliding movement members 21 are provided on the base member 20. The sliding movement members 21 slide along guide rails 41 on the guide members 40. Multiple step movement members 50 are formed in the guide members 40. The multiple step movement members 50 slide with the sliding member 30 and engage the sliding movement member 21 so that the sliding member 30 may be moved in multiple steps.

Figure 8:
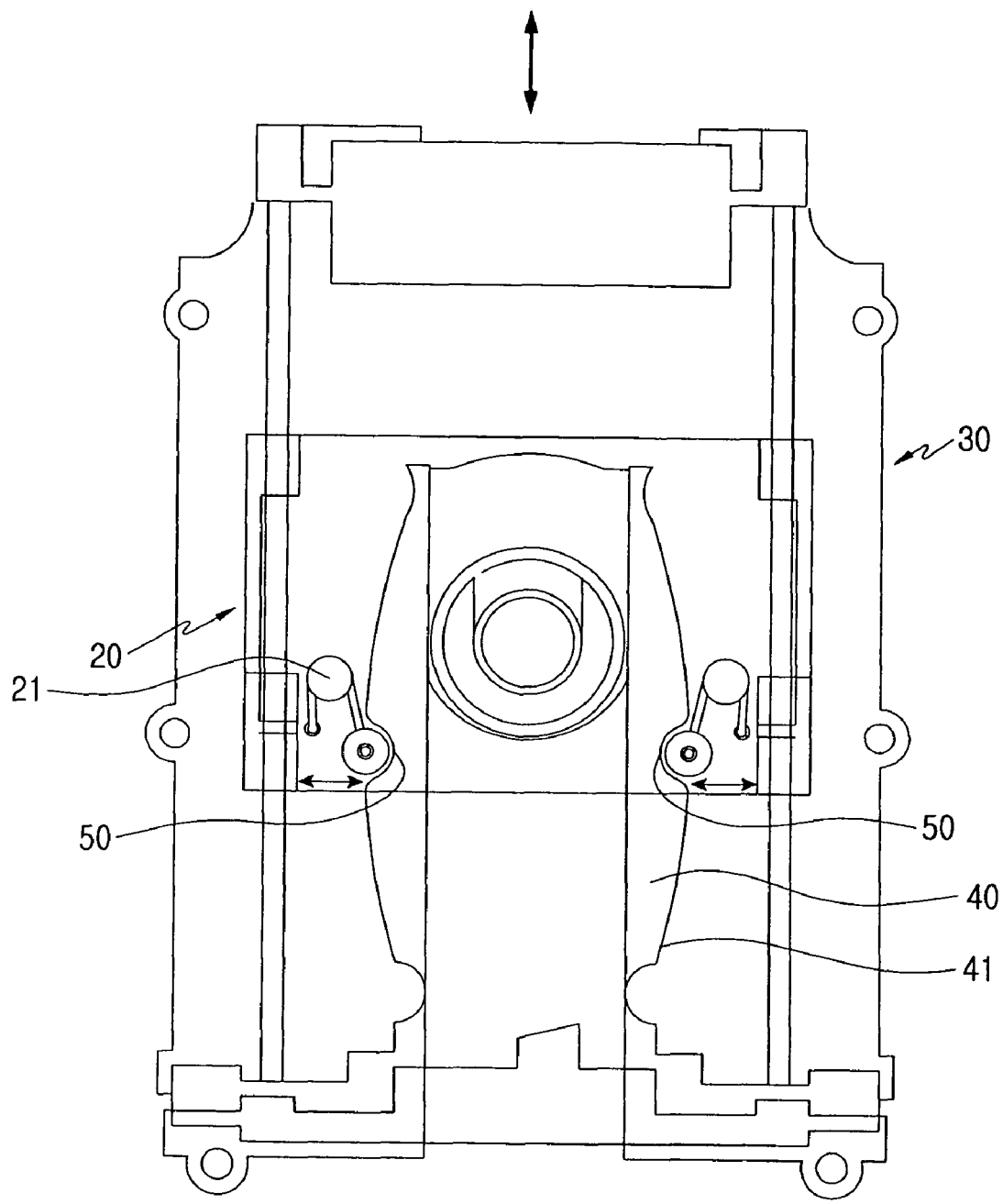
FIG. 8 is a plan view of the sliding type portable terminal according to the first exemplary embodiment of the present invention, after the sliding device operates.

As shown in FIGS. 7 and 8, the multiple step movement members 50 are recesses formed at desired depths in the guide rails 41 of the guide members 40.

The operation of the sliding device of the portable terminal with the above-mentioned configuration according to the first exemplary embodiment of the present invention will now be described in detail with reference to FIGS. 6 to 11.

Figure 9:
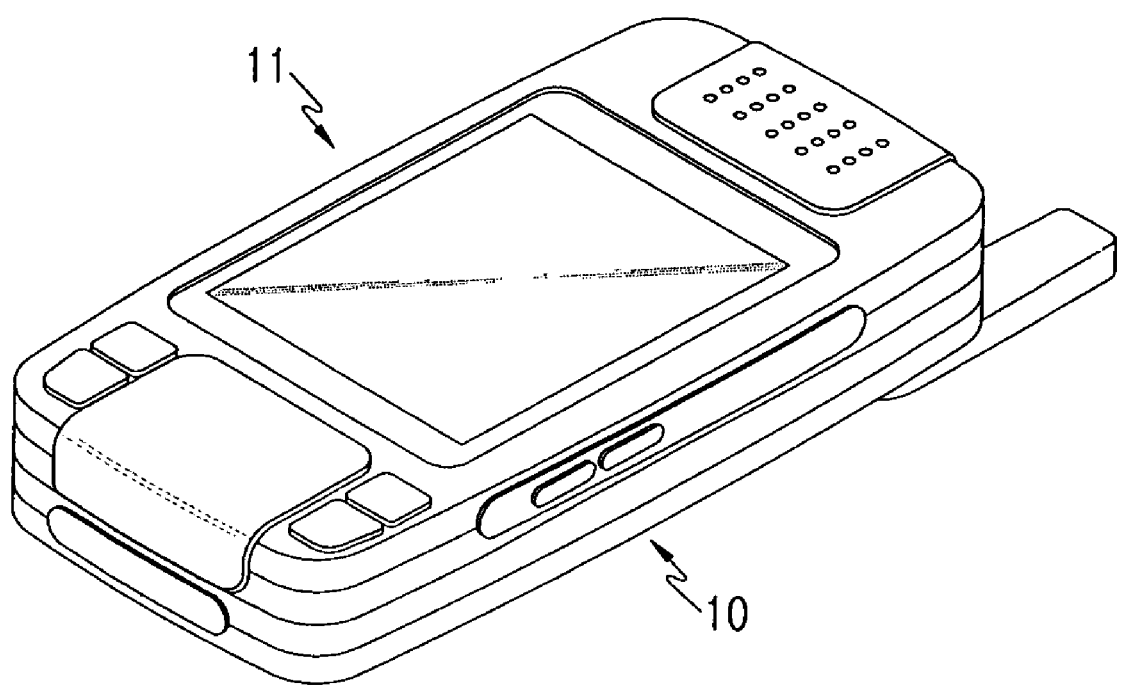
FIG. 9 is a perspective view of the sliding type portable terminal according to the first exemplary embodiment of the present invention, before the sliding housing slides.

Starting with FIGS. 6, 7, and 9, in an initial, closed position, the sliding housing 11 of the portable terminal is generally aligned with the body housing 10 of the portable terminal. The sliding movement members 21 are biased so that they engage the guide rails 41 of the guide members 40.

Figure 10:
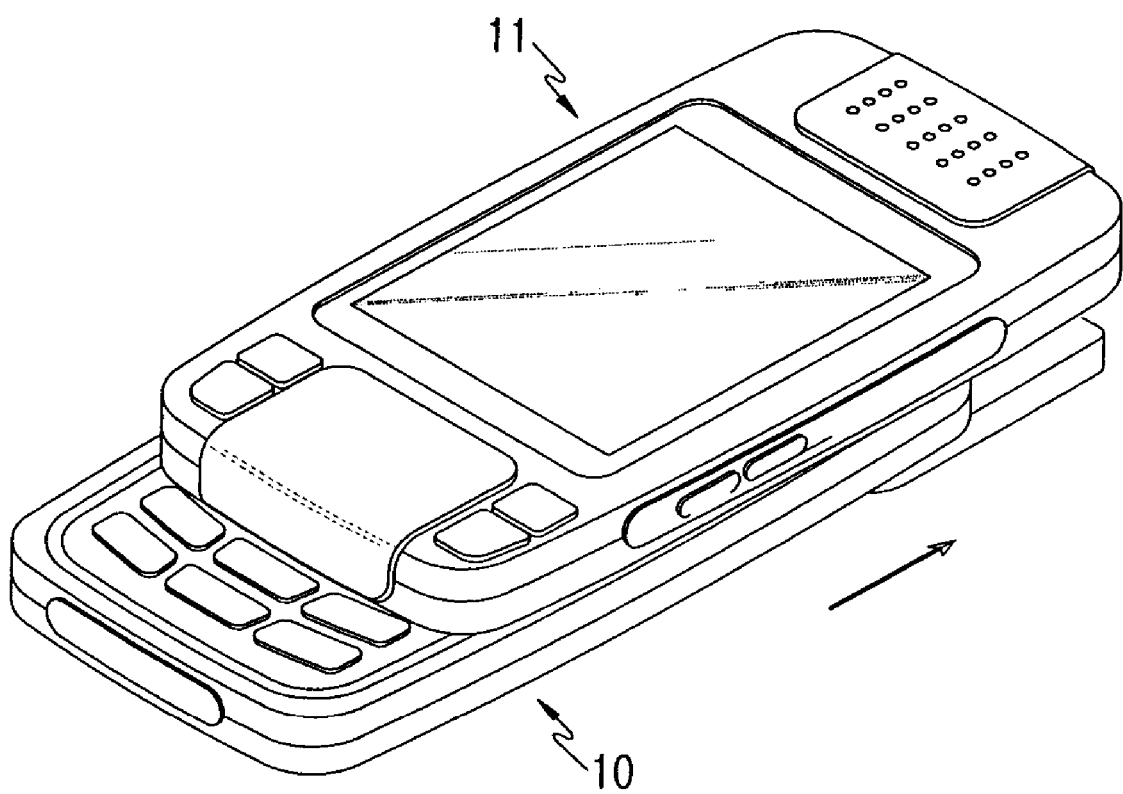
FIG. 10 is a perspective view of the sliding type portable terminal according to the first exemplary embodiment of the present invention, after the sliding housing slides in multiple steps.
Figure 11:
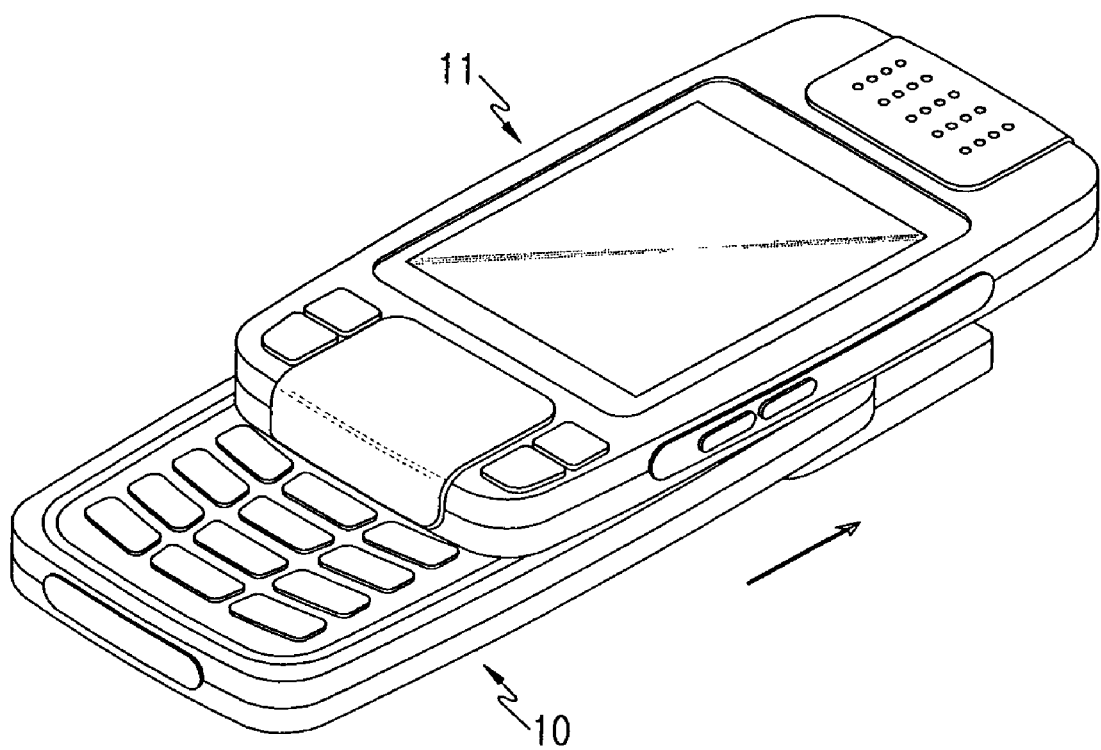
FIG. 11 is a perspective view of the sliding type portable terminal according to the first exemplary embodiment of the present invention, after the sliding housing moves to a finish position.

As shown in FIGS. 8 and 10, the sliding housing 11 may slide on the body housing 10 to move from the initial, closed position to a position where the sliding housing 11 is partially open with respect to the body housing 10. During the movement of the sliding housing 11, the sliding member 30 moves along with the sliding housing 11. Therefore, as shown in FIG. 8, as the sliding member 30 slides, the guide members 40 also move. The sliding movement members 21 are guided along the guide rails 41 of the guide member 40.

When arriving at a center portion of the guide rail 41, the sliding movement members 21 engage the multiple step movement members 50. The multiple step movement members 50 are recesses formed at a desired depth, and move with the guide rail 41 so that the sliding movement members 21 engage the recesses. The engagement of the sliding movement members 21 with the multiple step movement members 50 produces a tactile sensation, such as a click, so that a user may sense the movement of the sliding housing.

Thus, by providing multiple step movement members 50 at desired locations, the sliding housing 11 may slide and stop at multiple steps spaced apart by desired distances on the body housing 10.

If a user continues to apply force to the sliding housing 11, the guide rails 41 of the guide members 40 move, and the sliding movement members 21 disengage the multiple step movement members 50. Thus, the housing may be moved to the fully open position shown in FIG. 11, or may be returned to the initial, closed position shown in FIG. 9.

When the sliding housing 11 slides on the body housing 10 and returns to the initial position, the sliding member 30 moves along with the sliding housing 11. The sliding movement member 21 is guided by the guide member 40 of the sliding member 30. The multiple step movement member 50 formed in the guide member 40 moves along with the sliding member 30 and is engaged with or separated from the sliding movement member 21 so as to return the sliding housing 11 to the initial position.

As described above, since the sliding housing 11 slides on the body housing 10 in multiple steps, the sliding movement of the portable terminal is improved. In addition, the multiple step movement members provide tactile feedback (such as a click) so that a user can appreciate the sliding movement of the sliding housing 11.

The operation of a sliding device of the portable terminal according to a second exemplary embodiment of the present invention will now be described in detail with reference to FIGS. 12 and 13.

Figure 12:
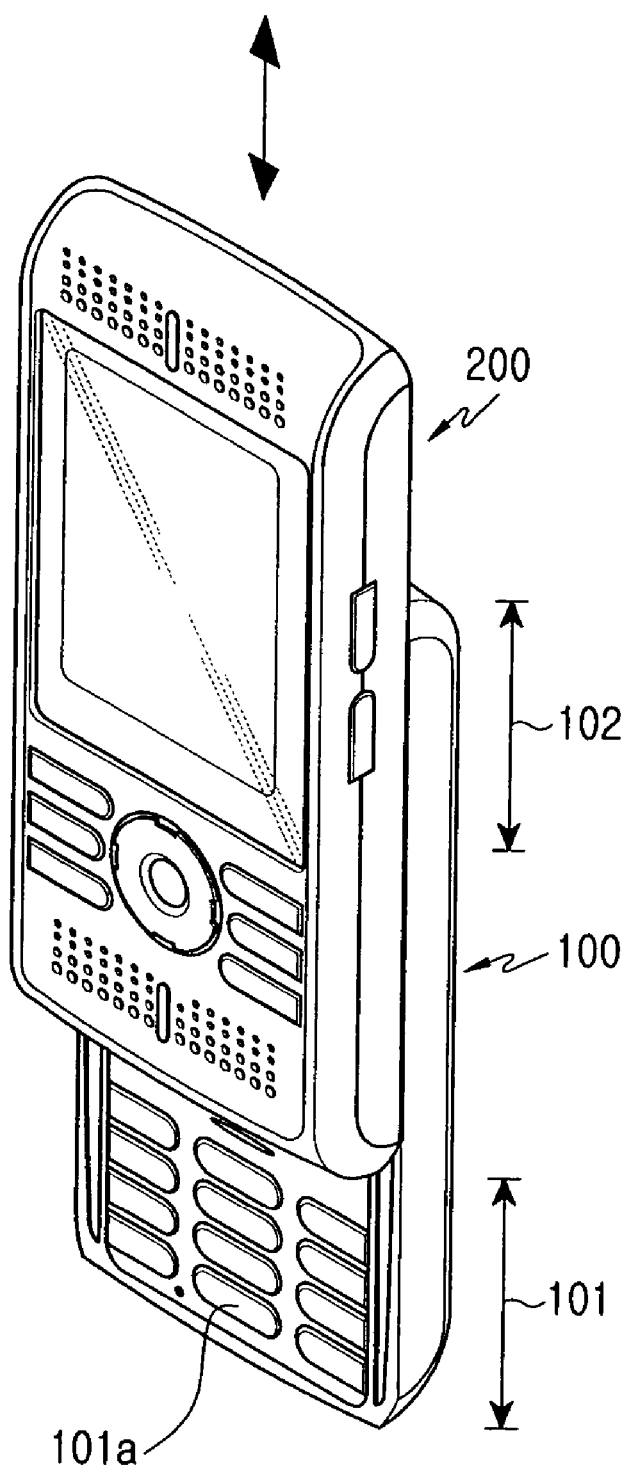
FIG. 12 is a perspective view of a sliding type portable terminal according to a second exemplary embodiment of the present invention, in which a sliding housing moves upward along a body housing.
Figure 13:
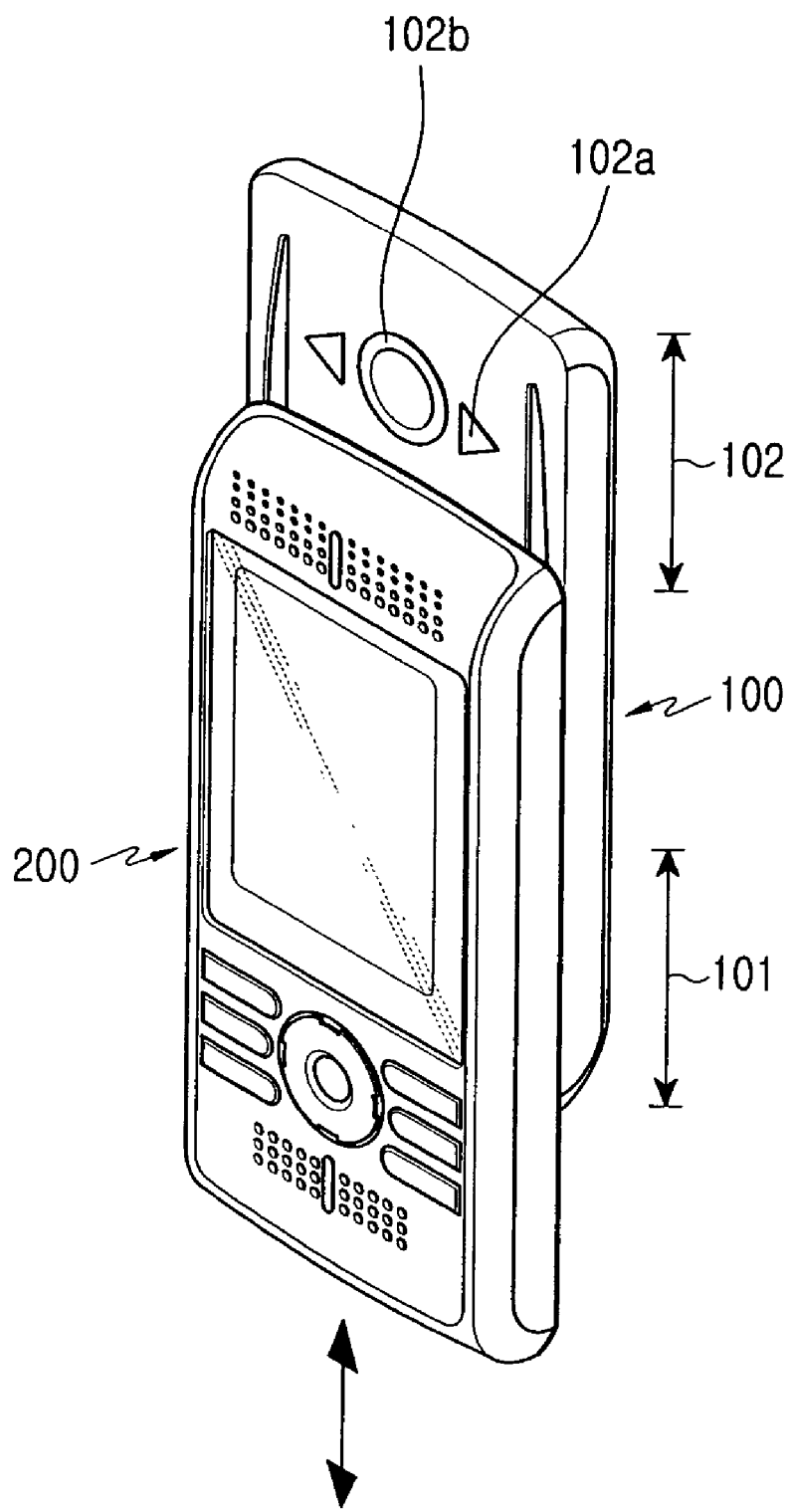
FIG. 13 is a perspective view of a sliding type portable terminal according to the second exemplary embodiment of the present invention, in which the sliding housing moves downward along the body housing.

As shown in FIGS. 12 and 13, the sliding type portable terminal includes a body housing 100 extending longitudinally, and a sliding housing 200. The sliding housing 200 slides upward and downward on the body housing 100 in a longitudinal direction so as to open and close upper and lower portions of the body housing 100 while facing the upper surface of the body housing 100.

As shown in FIGS. 12 and 13, the upper and lower portions of the body housing 100 have first and second regions 101 and 102, respectively. A keypad 101a in which a plurality of keys are arranged is disposed in the first region 101 in the lower portion of the body housing 100, and a plurality of game keys 102a and a camera lens module 102b are arranged in the second region 102 in the upper portion of the body housing 100.

As shown in FIG. 12, when the slide housing 200 slides upward on the body housing, the sliding housing 200 opens the first region 101 of the body housing 100. Therefore, the keypad disposed in the first region 101 is accessible, and a user can use the portable terminal in a communication mode.

When the sliding housing 200 slides on the body housing and returns to the initial position (that is, the position shown in FIG. 9 with respect to the first exemplary embodiment), the keypad 101a disposed in the first region 101 of the body housing 100 is covered with the sliding housing 200.

As shown in FIG. 13, when the sliding housing 200 slides downward along the body housing 100, the second region 102 of the body housing 100 is open. Since the game keys 102a and a camera lens module 102b are arranged in the second region of the body housing 100, the second region 102 is open when the sliding housing slides downward. In this state, a user can use the portable terminal in a game mode or a camera mode.

When the sliding housing slides and returns to the initial position, the second region 102 of the body housing 100 is covered with the sliding housing 200.

As described above, the sliding housing can slide upward and downward along the body housing so as to open and close the first and second regions of the body housing. Thus, it is possible to optimize the usage of space on the body housing.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A sliding device for a portable terminal including a body housing, a sliding housing sliding on the body housing while facing the body housing, and a sliding device enabling the sliding housing to slide on the body housing, the sliding device comprising:

a base member mounted to one of the body housing and the sliding housing, the base member being provided with a pair of sliding movement members;

a sliding member mounted to the remaining one of the body housing and the sliding housing, the sliding member being assembled with the base member so as to slide along a length of the base member semi-automatically;

a guide member extending from the sliding member and assembled with the sliding movement members to guide the sliding movement of the sliding movement member, the guide member having a guide rail, the sliding movement members being biased to contact the guide rail; and a plurality of multiple step movement members disposed on discrete portions of the guide rails, the multiple step movement members being detachably assembled with the sliding movement members for sliding the sliding member in multiple discrete steps.

2. The sliding device for a portable terminal as claimed in claim 1, wherein the base member is mounted on the body housing, and the sliding member is mounted on the sliding housing.

3. The sliding device for a portable terminal as claimed in claim 1, wherein the multiple step movement member is a recess for receiving the sliding movement members during the sliding movement of the sliding movement member.

4. The sliding device for a portable terminal as claimed in claim 1, wherein the multiple step movement members are formed on the guide member, and the guide member, the sliding movement members, and the multiple step movement members are formed on a periphery of the sliding member.

5. A -portable terminal, comprising:

a body housing extending longitudinally;

a sliding housing sliding upward and downward on the body housing in a longitudinal direction while facing the body housing, so as to open and close upper and lower portions of the body housing;

and a sliding device enabling the sliding housing to slide on the body housing, wherein the sliding device comprises;

a base member mounted to one of the body housing and the sliding housing, the base member being provided with a pair of sliding movement members;

a sliding member mounted to the remaining one of the body housing and the sliding housing, the sliding member being assembled with the base member so as to slide along a length of the base member semi-automatically;

a guide member extending from the sliding member and assembled with the sliding movement members so as to guide the sliding movement of the sliding movement members, the guide member having a guide rail, the sliding movement members being biased to contact the guide rail; and a plurality of multiple step movement members disposed on discrete portions of the guide rails, the multiple step movement members being detachably assembled with the sliding movement member for sliding the sliding member in multiple discrete steps.

6. The portable terminal as claimed in claim 5, wherein the body housing has a first region in which a keypad having a plurality of keys is provided, and a second region in which a plurality of keys are arranged, the first and second regions being formed in the lower and upper portions of the body housing, respectively.

7. The portable terminal as claimed in claim 6, wherein the second region further includes a camera lens module.

8. The portable terminal as claimed in claim 6, wherein the first region is open when the sliding housing slides upward on the body housing, wherein the second region is open when the sliding housing slides downward on the body housing, and wherein the first and second regions of the body housing are closed when the sliding housing is returned to an initial position.

9. The sliding device for a portable terminal as claimed in claim 1, wherein the pair of sliding movement members are biased toward the pair of guide members.

* * * * *